(12) United States Patent
Uenishi

(10) Patent No.: US 7,747,159 B2
(45) Date of Patent: Jun. 29, 2010

(54) FOCUSING DEVICE AND IMAGE-CAPTURING DEVICE PROVIDED WITH THE SAME

(75) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 12/026,845

(22) Filed: Feb. 6, 2008

(65) Prior Publication Data

US 2008/0193116 A1 Aug. 14, 2008

(30) Foreign Application Priority Data

Feb. 9, 2007 (JP) .............................. 2007-031281

(51) Int. Cl.
G03B 13/36 (2006.01)
G03B 3/10 (2006.01)
(52) U.S. Cl. ................... 396/135; 396/136; 396/123; 396/124; 396/127; 348/353; 348/357
(58) Field of Classification Search .......... 396/135–136
See application file for complete search history.

(56) References Cited

U.S. PATENT DOCUMENTS

| 5,157,432 | A | * | 10/1992 | Fukuoka et al. ............... 396/81 |
| 5,196,881 | A | * | 3/1993 | Hamada et al. .............. 396/104 |
| 5,212,516 | A | * | 5/1993 | Yamada et al. .............. 348/354 |
| 5,325,145 | A | * | 6/1994 | Hirasawa ..................... 396/81 |
| 5,649,239 | A | | 7/1997 | Tamekuni |
| 5,842,059 | A | * | 11/1998 | Suda .......................... 396/101 |
| 7,403,230 | B2 | * | 7/2008 | Yasuda ....................... 348/353 |
| 7,526,193 | B2 | | 4/2009 | Minato et al. |
| 7,536,096 | B2 | * | 5/2009 | Ito et al. ....................... 396/90 |
| 2002/0012533 | A1 | * | 1/2002 | Onozuka et al. ............. 396/89 |
| 2004/0207743 | A1 | | 10/2004 | Nozaki et al. |
| 2006/0182433 | A1 | | 8/2006 | Kawahara et al. |
| 2007/0195191 | A1 | * | 8/2007 | Ide et al. ..................... 348/345 |
| 2008/0193115 | A1 | * | 8/2008 | Uenishi ...................... 396/123 |
| 2009/0066815 | A1 | | 3/2009 | Nozaki et al. |

FOREIGN PATENT DOCUMENTS

| JP | 01-102412 A | 4/1989 |
| JP | 05-122580 A | 5/1993 |
| JP | 07-077649 A | 3/1995 |

(Continued)

OTHER PUBLICATIONS

Machine translation of JPO office action dated Jun. 19, 2009; obtained Jan. 27, 2009.*
The above references (items 1 and 2) were cited in the Explanation of Circumstances concerning accelerated examination filed on May 22, 2009, concerning the corresponding Japanese Patent Application No. 2007-031281, which is enclosed without English Translation.

(Continued)

Primary Examiner—Melissa J Koval
Assistant Examiner—Bret Adams
(74) Attorney, Agent, or Firm—Cowan, Liebowitz & Latman, P.C.

(57) ABSTRACT

A focusing device capable of setting (S402) a focusing area according to a detection result of a target subject, wherein even if the target subject is no longer detected, when the target subject is assumed to be present, the velocity of the movement of the focusing lens (104) is made slower. Thus, even if the target subject can no longer be detected, it is possible to suppress the in-focus position from changing significantly.

12 Claims, 10 Drawing Sheets

FOREIGN PATENT DOCUMENTS

| | | |
|---|---|---|
| JP | 08-054560 A | 2/1996 |
| JP | 2002-251380 | 9/2002 |
| JP | 2003-107335 | 4/2003 |
| JP | 2004-317699 A | 11/2004 |
| JP | 2005-049854 A | 2/2005 |
| JP | 2006-227080 A | 8/2006 |

OTHER PUBLICATIONS

The above references were cited in a Jun. 19, 2009 Japanese Office Action that issued in Japanese Patent Application No. 2007-031281, which is enclosed without English Translation.

* cited by examiner

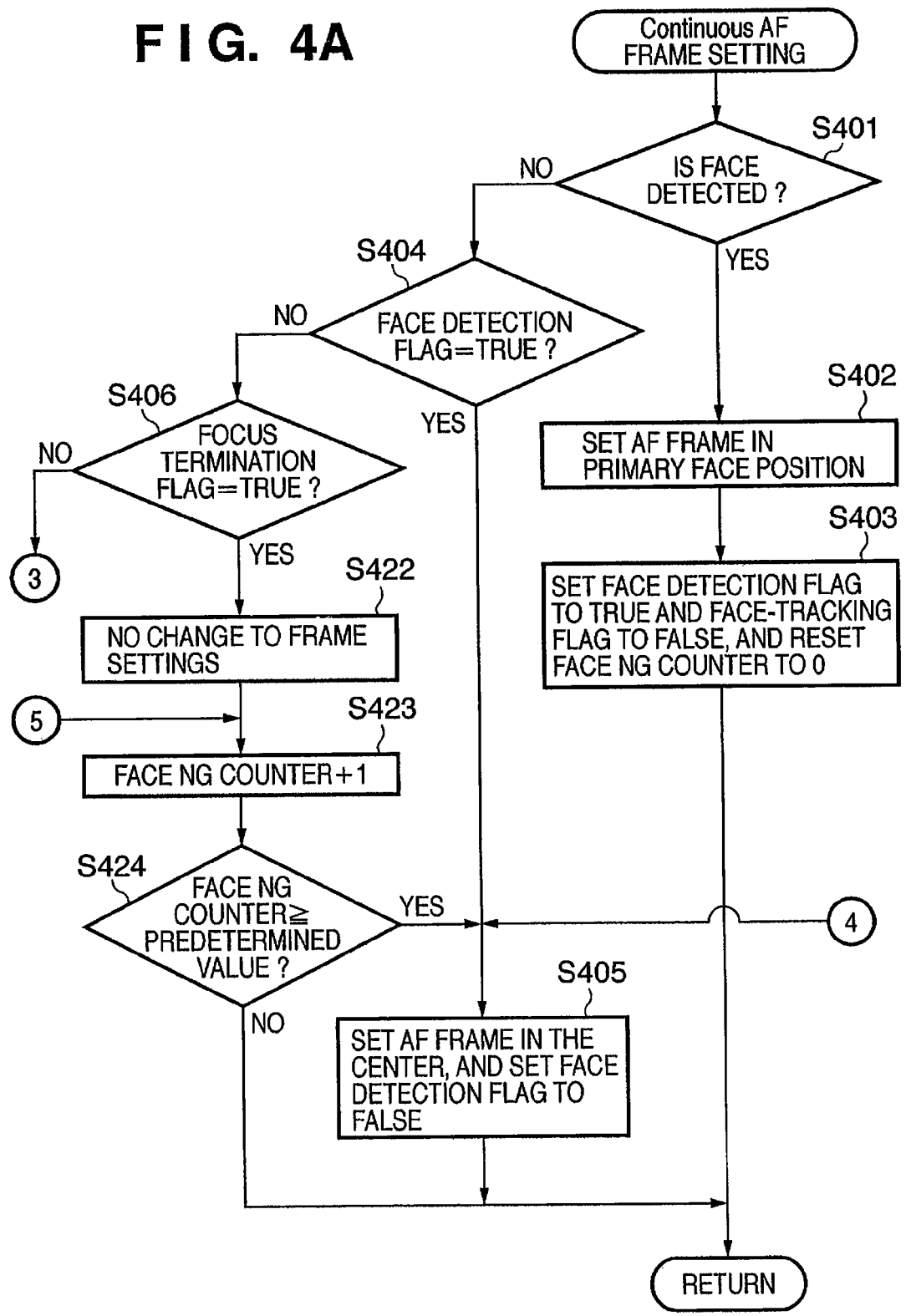
F I G. 4A

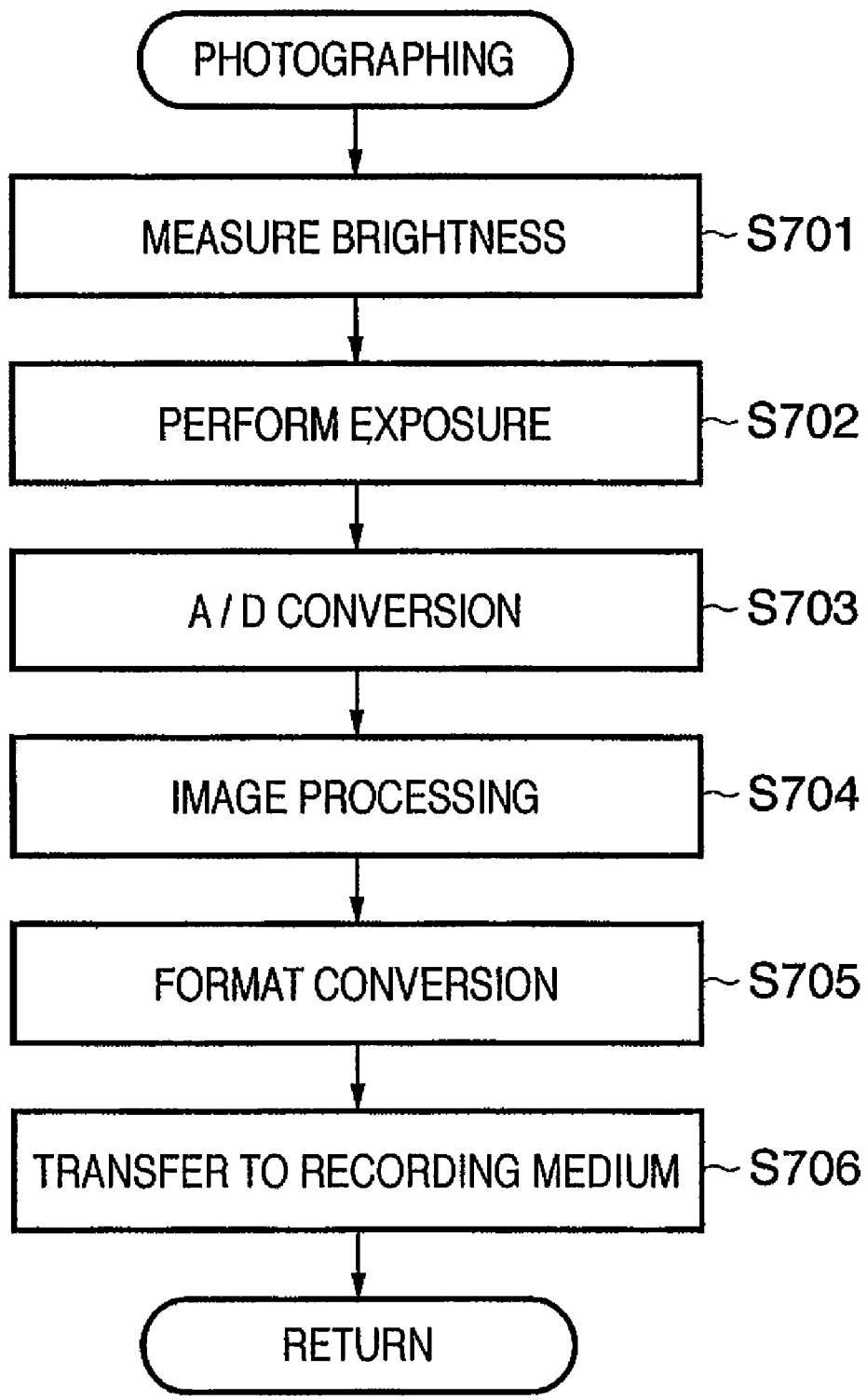

FOCUSING DEVICE AND IMAGE-CAPTURING DEVICE PROVIDED WITH THE SAME

BACKGROUND OF THE INVENTION

1. Field of the Invention

The present invention relates to a focusing device, and more particularly to a focusing device capable of setting a focusing area according to the result of detecting a target subject. The present invention further relates to an image-capturing apparatus provided with such a focusing device.

2. Description of the Related Art

Autofocus control that utilizes a subject detection function for detecting the face of a human figure, a moving subject, or the like is known to be conventionally used in image-capturing apparatuses as typified by digital cameras. This is a technique for focusing on a target subject such as the face of a human figure by detecting the target subject from a captured image, setting a focusing area in a part of the detected target subject, and performing focus control (see Japanese Patent Laid-Open No. 2003-107335).

If the target subject cannot be detected with such autofocus control, focus control can conceivably be performed by setting a focusing area in an area that is generally considered highly probable to include a target subject, such as the center of the image.

When shooting a movie or the like, there are situations where continuous autofocus (AF) that continuously performs control to focus on a set focusing area is performed. If the above-described autofocus control, which utilizes the detection of a target subject, is applied to the continuous AF, although no problem arises when a target subject is detected continuously, a problem arises in a case such as where the target subject cannot be detected.

In other words, when a target subject is detected, a focusing area is set in a part of the target subject, whereas when the target subject can no longer be detected, the focusing area is set in the center area of the image. Accordingly, the focusing area frequently switches between the target subject area and the center area of the screen, so when the target subject is not in the center of the screen, the in-focus position changes at a very rapid pace.

This condition shall be described with reference to FIGS. 8A to 8D.

When photographing a scene in which a target subject (a person's face, in this case) is not in the center area of the screen, as shown in FIG. 8A, if the target subject 810 is detected, a focusing area 801 is set in a position corresponding to the position of the target subject.

When the detection of the target subject (i.e., the detection of the face, in this case) fails after the target subject 810 has turned his/her face to a side or the like, a focusing area 802 is set in the center of the screen. Generally, when no target subject is present in the center of the screen, the in-focus position changes. Particularly, when photographing a scene containing a distant landscape in the background, the in-focus position changes significantly.

If the target subject then turns back to the front again, the target subject is detected, and the display is returned to the state shown in FIG. 8A. Such change of the in-focus position between the target subject and the subject that is in the background causes a problem that flicker occurs in the image, which is distracting for the user.

To solve this problem, a remedy has been conceived in which the position of the target subject is predicted with some kind of method even when the target subject can no longer be detected, and a focusing area 803 is set in the predicted position of the target subject as shown in FIG. 8C.

However, even if the position of the target subject can be predicted, it is difficult to accurately predict the position of the target subject continuously. If a focusing area 804 is set in an erroneously predicted position of the target subject as shown in FIG. 8D, there is no way to solve the problem.

SUMMARY OF THE INVENTION

The present invention has been conceived to solve at least one of the problems encountered with the conventional technology described above. The present invention provides a focusing device capable of setting a focusing area according to a detection result of a target subject wherein even when the target subject can no longer be detected, it is possible to suppress the in-focus position from changing significantly. The present invention also provides an image-capturing apparatus provided with the focusing device.

According to one aspect of the present invention, there is provided a focusing device comprising: a detection unit adapted to detect a focusing target from a captured image; a setting unit adapted to set, in response to the detection of the focusing target by the detection means, a focusing area for detecting a focusing condition of a focusing lens; and a focus adjustment unit adapted to perform focus adjustment by moving the focusing lens based on an image of the focusing area, wherein the focus adjustment unit is operable, when the focusing area has been set by the setting unit in response to the detection of the focusing target by the detection unit, to cause the focusing lens to move at a first velocity, and further operable, when the focusing target is no longer detected after the focusing area has been set, to cause the focusing lens to move at a second velocity that is slower than the first velocity.

According to another aspect of the present invention, there is provided a focusing device comprising: detection means for detecting a focusing target from a captured image; setting means for setting, in response to the detection of the focusing target by the detection means, a focusing area for detecting a focusing condition of a focusing lens; and focus adjustment means for performing focus adjustment by moving the focusing lens based on an image of the focusing area, wherein the focus adjustment means is operable, when the focusing area has been set by the setting means in response to the detection of the focusing target by the detection means, to cause the focusing lens to move at a first velocity, and further operable, when the focusing target is no longer detected after the focusing area has been set, to cause the focusing lens to move at a second velocity that is slower than the first velocity.

According to still another aspect of the present invention, there is provided an image-capturing apparatus comprising: an image-capture unit adapted to photoelectrically convert an image of a subject and output an image; a recording unit adapted to perform control to record the image obtained by the image-capture unit in a recording medium; and a focusing device comprising: a detection unit adapted to detect a focusing target from a captured image; a setting unit adapted to set, in response to the detection of the focusing target by the detection means, a focusing area for detecting a focusing condition of a focusing lens; and a focus adjustment unit adapted to perform focus adjustment by moving the focusing lens based on an image of the focusing area, wherein the focus adjustment unit is operable, when the focusing area has been set by the setting unit in response to the detection of the focusing target by the detection unit, to cause the focusing lens to move at a first velocity, and further operable, when the focusing target is no longer detected after the focusing area has been set, to cause the focusing lens to move at a second velocity that is slower than the first velocity.

According to yet another aspect of the present invention, there is provided an image-capturing apparatus comprising: an image-capture means for photoelectrically converting an image of a subject and outputting an image; a recording means for performing control to record the image obtained by the image-capture means in a recording medium; and a focusing device comprising: detection means for detecting a focusing target from a captured image; setting means for setting, in response to the detection of the focusing target by the detection means, a focusing area for detecting a focusing condition of a focusing lens; and focus adjustment means for performing focus adjustment by moving the focusing lens based on an image of the focusing area, wherein the focus adjustment means is operable, when the focusing area has been set by the setting means in response to the detection of the focusing target by the detection means, to cause the focusing lens to move at a first velocity, and further operable, when the focusing target is no longer detected after the focusing area has been set, to cause the focusing lens to move at a second velocity that is slower than the first velocity.

According to still yet another aspect of the present invention, there is provided a focusing method comprising: detecting a focusing target from a captured image; setting, in response to the detection of the focusing target, a focusing area for detecting a focusing condition of a focusing lens; and adjusting a focus by moving the focusing lens based on an image of the focusing area, wherein the adjusting comprises, when the focusing area has been set, causing the focusing lens to move at a first velocity, and further comprises, when the focusing target is no longer detected, causing the focusing lens to move at a second velocity that is slower than the first velocity.

Further features of the present invention will become apparent from the following description of exemplary embodiments with reference to the attached drawings.

BRIEF DESCRIPTION OF THE DRAWINGS

FIGS. 4A and 4B are flowcharts illustrating the details of the continuous AF frame setting process in a digital camera according to an embodiment of the present invention.

FIG. 7 is a flowchart used to illustrate the details of the photographing operation of a digital camera according to an embodiment of the present invention.

DESCRIPTION OF THE EMBODIMENTS

Preferred embodiments of the present invention will now be described in detail with reference to the accompanying drawings.

Figure 1:
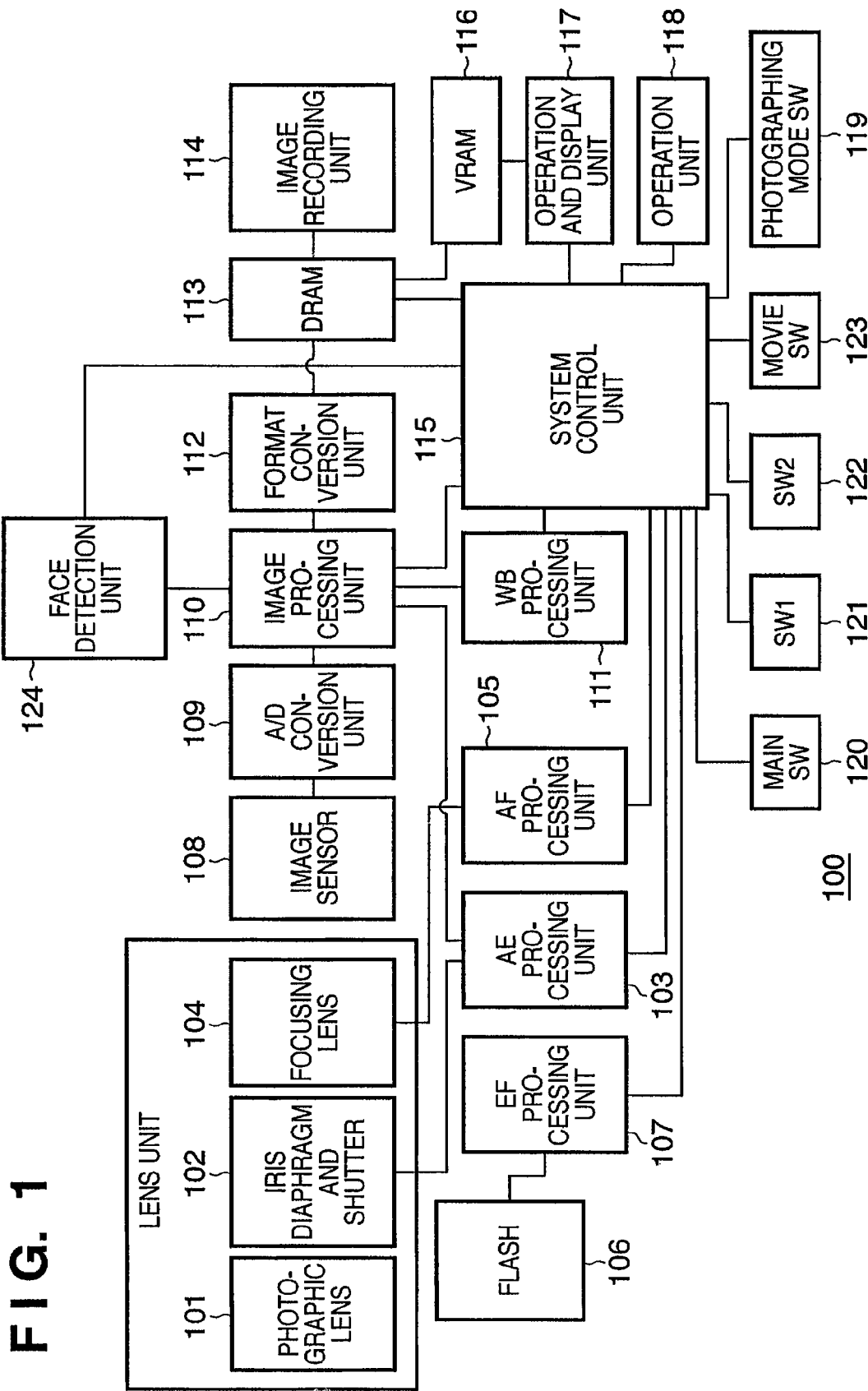
FIG. 1 is a block diagram showing an exemplary configuration of a digital camera as an example of an image-capturing apparatus provided with a focusing device according to an embodiment of the present invention.

FIG. 1 is a block diagram illustrating an exemplary configuration of a digital camera as an example of an image-capturing apparatus provided with a focusing device according to an embodiment of the present invention.

In the digital camera 100 according to the present embodiment, a lens unit is comprised of: a photographic lens 101 that includes a zoom mechanism; a iris diaphragm and shutter 102 that controls the amount of light; and a focusing lens 104 for focusing on an image sensor. An automatic exposure control (AE) processing unit 103 controls the iris diaphragm and shutter 102, and performs automatic exposure control. An AF processing unit 105 serving as a driving means moves the focusing lens 104, and performs autofocus control. An flash pre-emission (EF) processing unit 107 controls a flash 106 to fire. An image sensor 108 is a photoelectric conversion element such as a CCD image sensor or CMOS image sensor, and converts optical images of a target subject into electrical signals on a pixel-by-pixel basis.

An A/D conversion unit 109 converts electrical signals outputted by the image sensor 108 into digital pixel data. The A/D conversion unit 109 includes a correlated double sampling (CDS) circuit that removes noise from the signals outputted by the image sensor 108, and a non-linear amplifier circuit before the A/D conversion.

An image processing unit 110 performs a color interpolation process on the pixel data that has undergone A/D conversion to generate color image data. A white balance (WB) processing unit 111 performs a white balance process on the color image data generated by the image processing unit 110. A format conversion unit 112 encodes the image data into, for example, a JPEG format (including the motion JPEG format) or an MPEG format, and decodes the encoded image data.

An internal memory 113 can be, for example, a random access memory (RAM) or the like, which will be hereinafter referred to as "DRAM". The DRAM 113 is used as a high-speed buffer for temporarily storing images, or as a working memory for compression and decompression processes performed on images by the format conversion unit 112. An image recording unit 114 is made up of a recording medium, such as a memory card, and an interface therefor.

A system control unit 115 includes, for example, a CPU (not shown) and a ROM that stores programs that are to be executed by the CPU, and performs control of the overall operation of the digital camera 100, including an autofocus control process, which shall be described later. An image display memory (VRAM) is a memory for storing display image data to be displayed on an operation and display unit 117. The system control unit 115 functions as a setting means and a determination means.

The operation and display unit 117 has a display device such as an LCD or organic EL display panel. Furthermore, the operation and display unit 117 displays an image recorded in a recording medium inserted in the image recording unit 114, and also displays a settings screen such as a menu screen, various messages, and a state of the camera by means of characters and images. The operation and display unit 117 also functions as an electronic view finder (EVF) when shooting an image, and displays a set focusing area (e.g., a frame that defines the focusing area).

An operation unit 118 is an input device (keys, buttons, a touch panel, a dial, or the like) through which the user gives an instruction to the digital camera 100. The operation unit 118 further includes the following, for example: a menu switch for displaying a menu screen that allows various settings including the settings for the photographing function of the digital camera 100, the settings for playback of images, and the like to be performed; a zoom lever that instructs the photographic lens to perform zoom operations; a change switch for changing the operation mode (a photographing mode and a playback mode); up, down, right, and left directional keys; and the like.

A photographing mode switch 119 is a switch with which a target subject (a person's face in the present embodiment) detection mode is turned on or off. A main switch 120 functions as a power switch for powering on and off the digital camera.

An SW1 121 is a switch that is turned on when, for example, the shutter button is pressed halfway down. When the SW1 121 is turned on, the digital camera 100 of the present embodiment performs a standby operation for photographing such as AF and AE. An SW2 122 is a switch that is turned on when, for example, the shutter button is pressed down fully. When the SW2 122 is turned on, the digital camera 100 of the present embodiment starts a photographing operation based on the result of the standby operation for photographing.

A movie switch (movie SW) 123 is a switch with which the user provides an instruction to start or end the movie shooting to the digital camera 100. In the present embodiment, when the movie SW 123 is turned on, movie recording is started. When the movie SW 123 is once again turned on during the movie recording, the movie recording is terminated.

A face detection unit 124 as a means for detecting a target subject having a predetermined feature applies a known face detection method to the image data having been processed by the image processing unit 110 so as to detect a human face(s) as a target subject. Then, the face detection unit 124 provides information on the detected face or faces (the position and size of an area that is considered to include the face(s), and the reliability of the detection, all of which will be hereinafter collectively referred to as "face information") and the priority order determined based on the face information to the system control unit 115. As the method for detecting a human face, a known technique can be used, and since it has no direct relation with the present invention, its detailed description is omitted here.

Specifically, a known face detection technique can be used in the present embodiment.

Examples of the known face detection technique include: a method based on learning using a neural network; and a method in which the parts having a characteristic shape such as the eye, nose, and mouth are found using template matching, and a face is recognized if the degree of matching is high; in addition, many more have been proposed, including a method in which the amount of image features such as the skin color and the eye shape is detected, and a statistical analysis is performed. In general, a plurality of these methods are combined to improve the accuracy of the face detection.

One specific example is described in Japanese Patent Laid-Open No. 2002-251380, which discloses a method for detecting a face using wavelet transformation and the amount of image features.

Also, there is no particular limitation on the reliability. For example, it is possible to determine that the reliability is high when the total degree of matching of face parts in an area considered to be a face is not less than a threshold value. Accordingly, it can be assumed that the higher the degree a face area satisfies the conditions for recognizing a face, the higher the reliability of the face area.

(Overall Operation)

Figure 2:
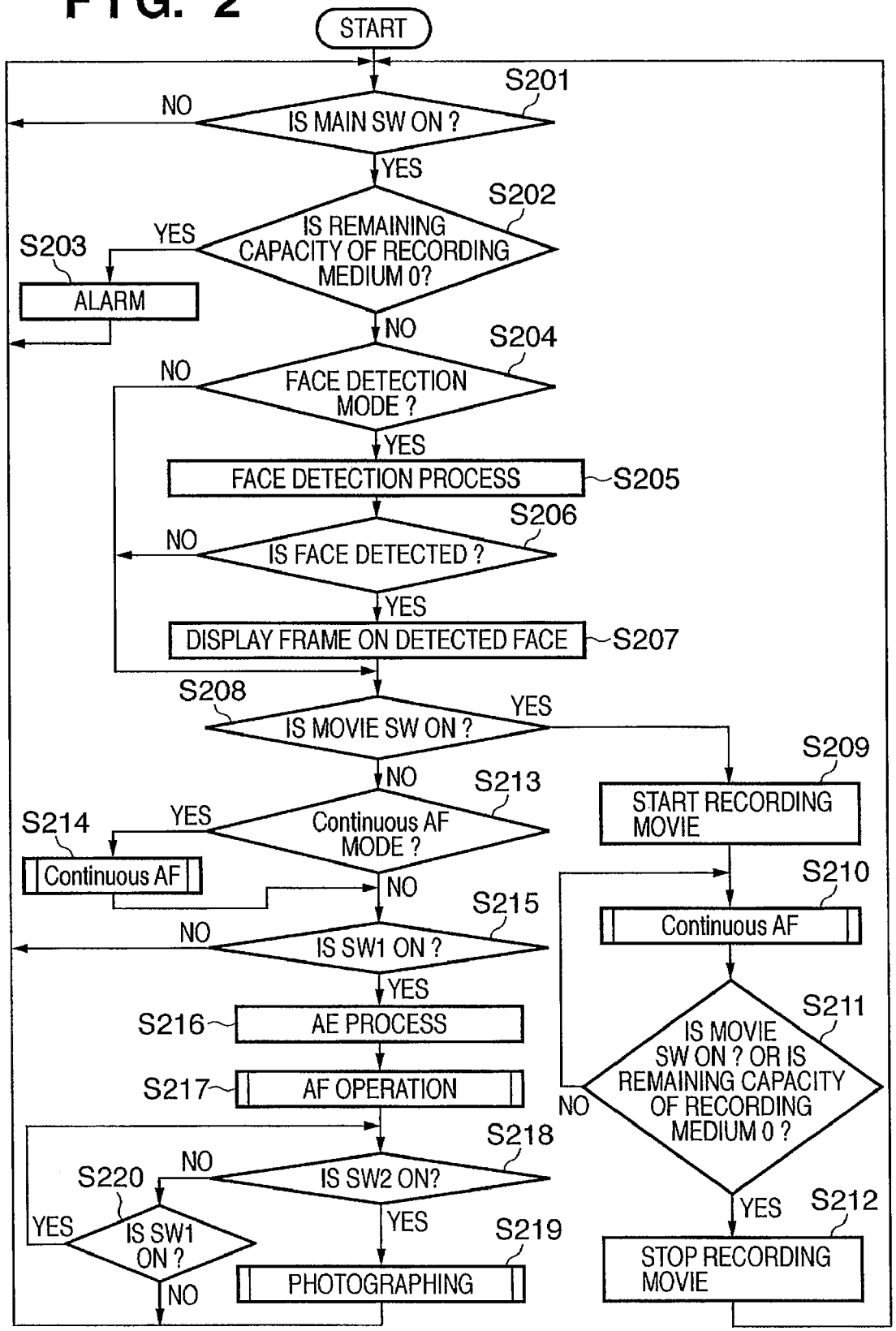
FIG. 2 is a flowchart used to illustrate the overall operation of a digital camera according to an embodiment of the present invention.

Hereinafter, the overall operation of the digital camera according to the present embodiment shall be described with reference to the flowchart shown in FIG. 2.

First, in S201, the system control unit 115 detects the state of the main switch 120. If the main switch 120 is turned on, the process advances to S202. Note that the role of the main switch 120 is to power the digital camera 100 on and off.

In S202, the system control unit 115 acquires the remaining capacity of a recording medium, which is inserted in the image recording unit 114, via the image recording unit 114, and determines whether or not the recording medium is inserted, and whether or not the remaining capacity is 0 (the remaining capacity is not limited strictly to 0, and the system control unit 115 could determine whether the remaining capacity equals a level at which it is substantially impossible to shoot even a single image).

If the remaining capacity is 0, the process advances to S203. Otherwise, the process advances to S204. In S203, the system control unit 115 causes the operation and display unit 117 to display an alarm message indicating, for example, that the recording capacity is insufficient, and the process returns to S201. The alarm generated in S203 can be provided by displaying the message on the operation and display unit 117, by outputting an alarm sound from a sound output unit (not shown), or by a combination of the two.

In S204, the system control unit 115 determines whether or not the AF mode is in the face detection mode. If the AF mode is in the face detection mode, the process advances to S205. If the AF mode is not in the face detection mode, the process advances to S208.

In S205, the system control unit 115 instructs the face detection unit 124 to execute a face detection process. The face detection unit 124 performs a face detection process on the image data having been processed by the image processing unit 110, and acquires the face information and the priority order of the face, and provides them to the system control unit 115. The image on which the face detection unit 124 performs face detection may be a display image generated from each image that is shot successively in order to, for example, allow the operation and display unit 117 to function as an EVF. When recording a movie, the face detection process may be performed on an actually recorded image that has a resolution higher than that of the display images.

In S206, the system control unit 115 determines whether or not a face has been detected based on the result of the face detection process in S205. If a face is detected, the system control unit 115 performs an additional display of an area that indicates the detected face on the EVF screen displayed on the operation and display unit 117. In the present embodiment, the face area is displayed by superimposing a frame on the EVF screen as shown in FIGS. 8A to 8D.

Furthermore, in the present embodiment, the system control unit 115 displays a frame for the Z (where Z is an integer not less than 1) highest faces of the priority order among the faces detected by the face detection process. The frame to be displayed does not necessarily have a shape that defines a detected face area, and the shape may be a quadrangle that is circumscribed around the face area or a quadrangle within the face area.

In S208, the system control unit 115 detects the state of the movie SW 123. If the movie SW 123 is turned on, the process advances to S209. If the movie SW 123 is turned off, the process advances to S213.

In S209, the system control unit 115 starts recording a movie. In 8210, the system control unit 115 controls the AF processing unit 105, and performs continuous AF in accordance with the flowcharts of FIGS. 3A and 3B, which shall be described later. In S211, the system control unit 115 detects the state of the movie SW 123. If the movie SW 123 is turned on, the process advances to S212. If the movie SW 123 is not turned on, the process advances to S210.

In S211, the remaining capacity of the recording medium inserted in the image recording unit 114 is determined. If the remaining capacity is 0, the process advances to S212. If the remaining capacity is not 0, the process advances to S210.

In S212, the system control unit 115 ends recording the movie, and the process returns to S201.

In S208, if the movie SW 123 is turned off, the system control unit 115 determines, in S213, whether the AF mode is in a continuous AF mode or single AF mode. Then, if the mode is in a continuous AF mode, the process advances to S214. If the mode is in a single AF mode, the process advances to S215. In S214, the system control unit 115 controls the AF processing unit 105, and executes continuous AF in accordance with the flowcharts of FIGS. 3A and 3B, which shall be described later.

In S215, the state of the SW1 121 is determined. If the SW1 121 is turned on, the process advances to S216. Otherwise, the process returns to S201. In S216, the system control unit 115 instructs the AE processing unit 103 to execute an AE process based on the image data outputted by the image processing unit 110. Then, the AE processing unit 103 determines an appropriate aperture and an appropriate shutter speed value.

Figure 6:
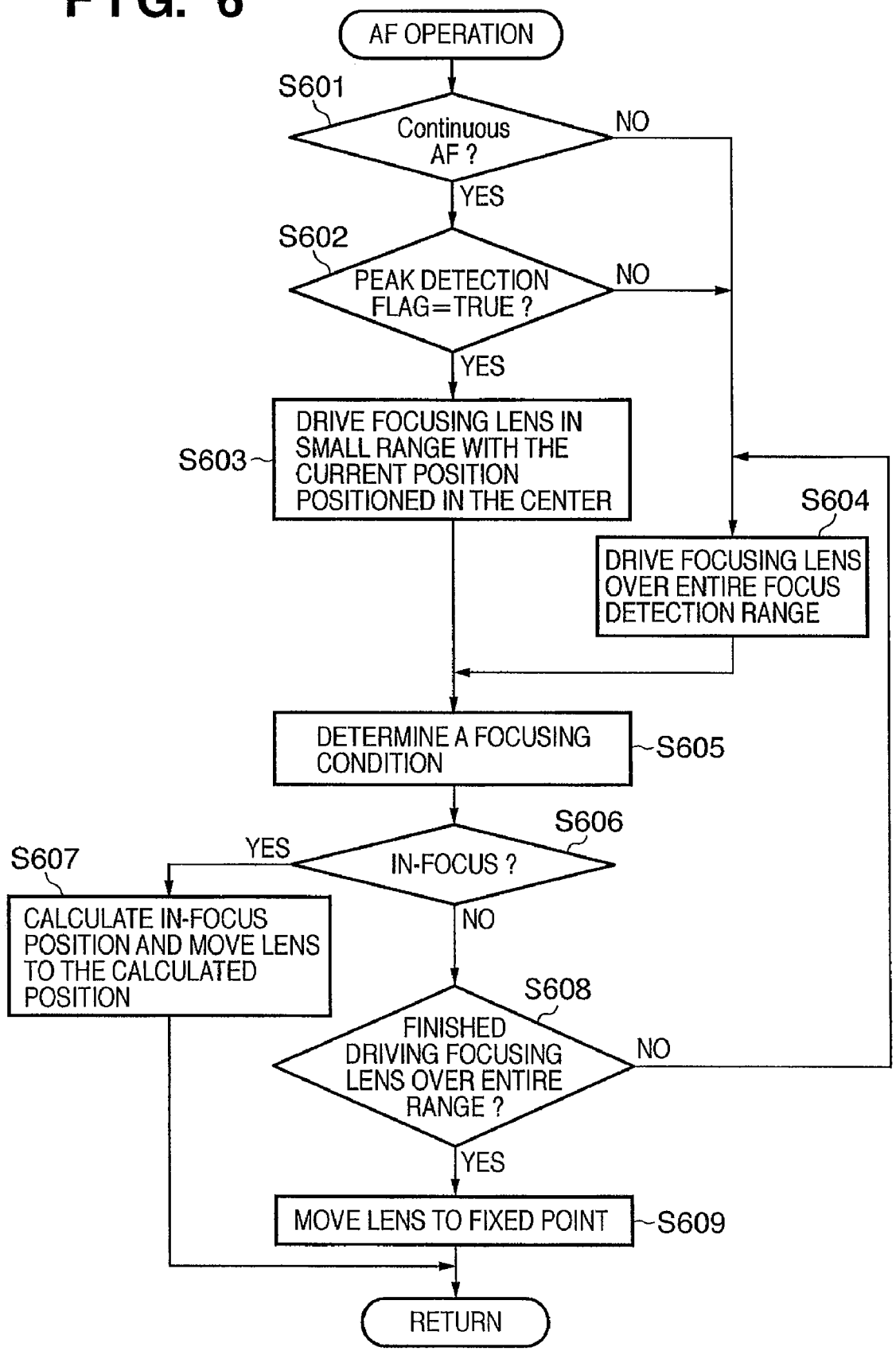
FIG. 6 is a flowchart used to illustrate the details of the AF operation of a digital camera according to an embodiment of the present invention.

Furthermore, in S217, the system control unit 115 controls the AF processing unit 105 in accordance with the flowchart of FIG. 6, which shall be described later, and performs an AF operation. In S218, the system control unit 115 determines the state of the SW2 122. If the SW2 122 is turned on, the process advances to S219. Otherwise, the process advances to S220.

In S219, the system control unit 115 performs control of a photographing operation in accordance with the flowchart of FIG. 7, which shall be described later. In S220, the system control unit 115 determines the state of the SW1 121. If the SW1 121 is turned off, the process returns to S201. If the SW1 121 is turned on, the process returns to S218, and the focus is locked until the SW2 122 is turned on or when the SW1 121 is turned off.

(Continuous AF Operation)

The continuous AF process performed in S210 and S213 of the flowchart of FIG. 2 shall be described below in detail.

Figure 3A:
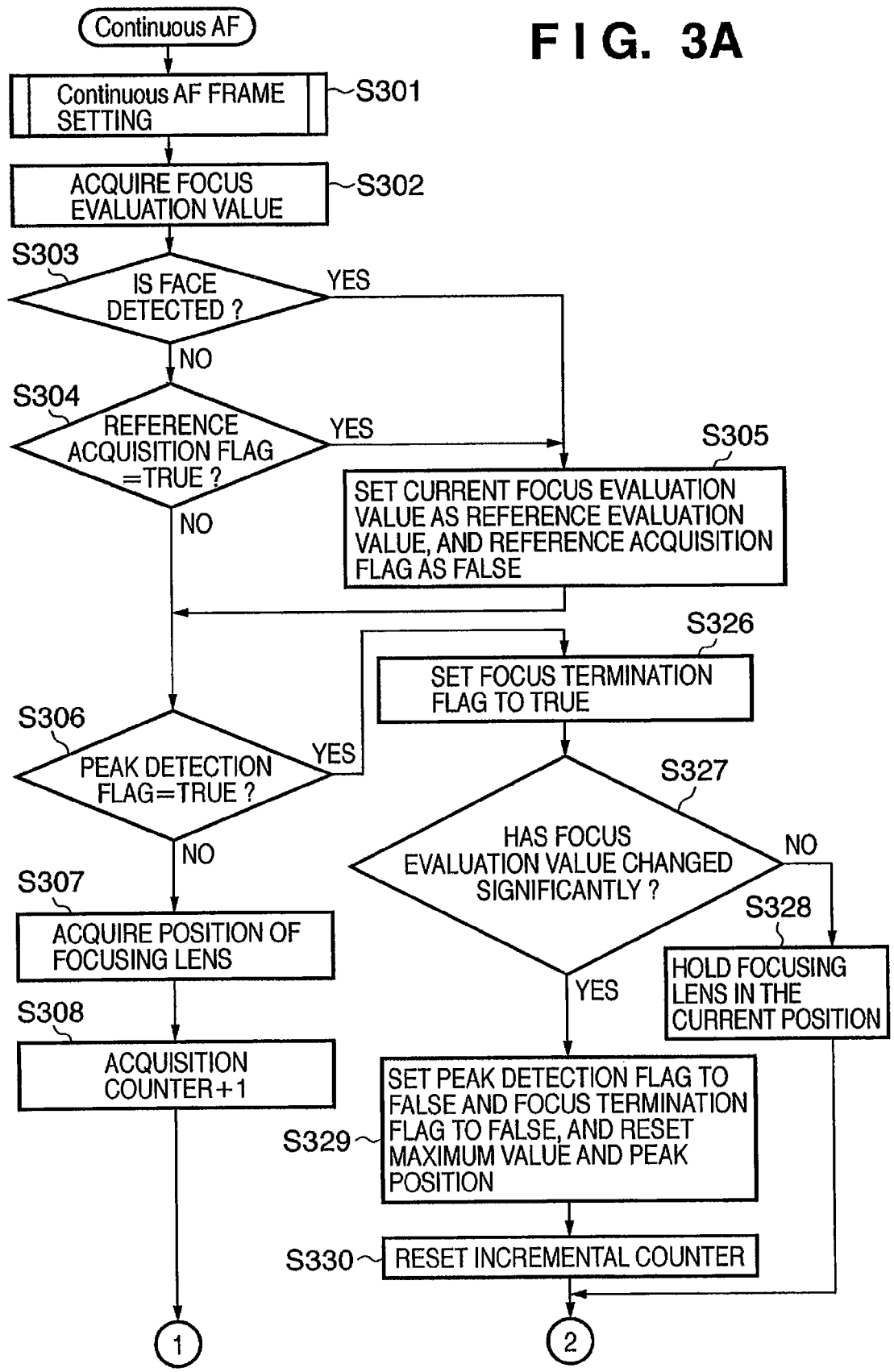
FIGS. 3A and 3B are flowcharts illustrating the details of the continuous AF process of a digital camera according to an embodiment of the present invention.
Figure 3B:
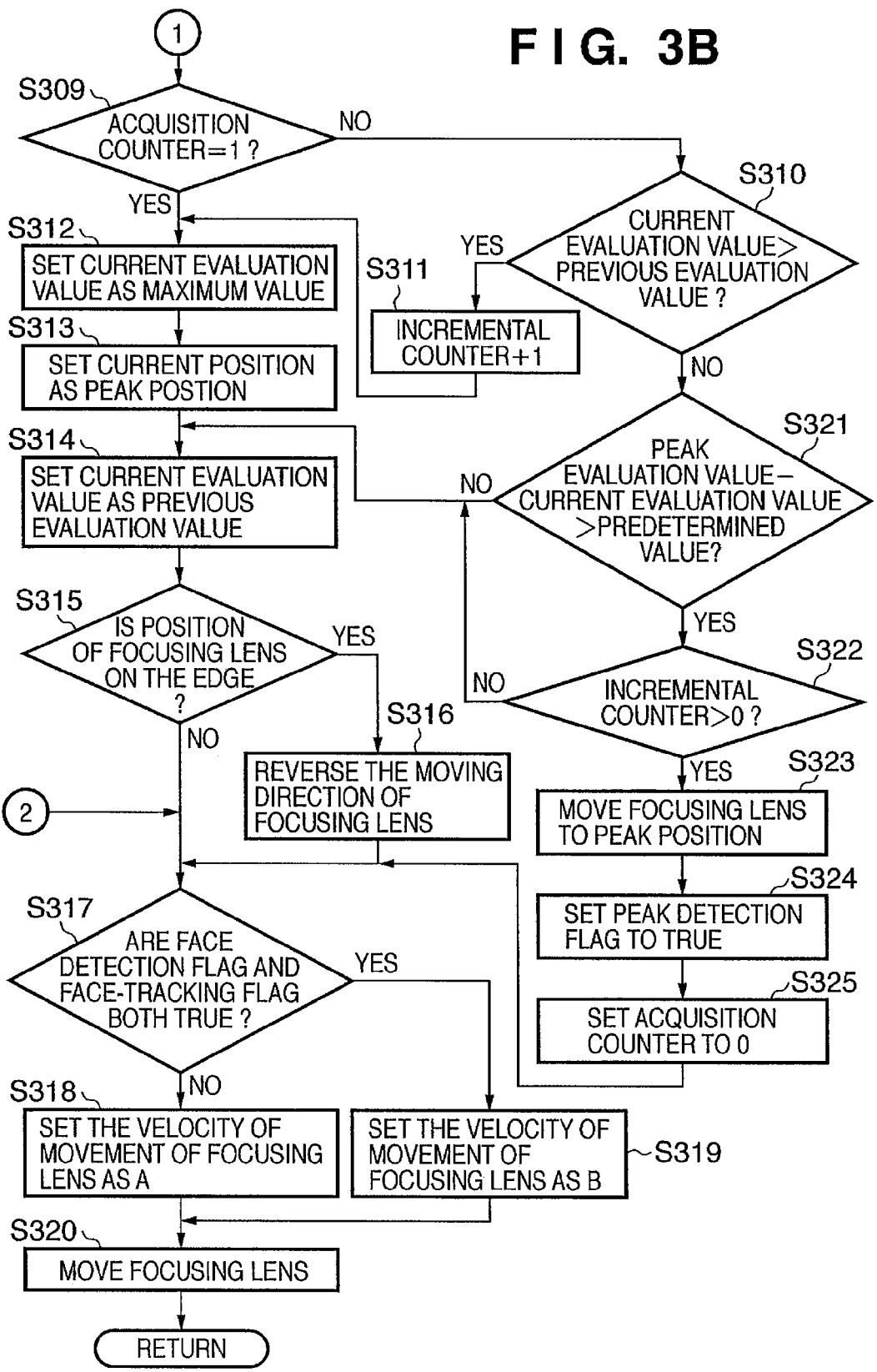

FIGS. 3A and 3B are flowcharts illustrating the details of the continuous AF process of the digital camera of the present embodiment.

In S301, the system control unit 115 sets a focusing area (hereinafter referred to as "AF frame") in accordance with the flowcharts of FIGS. 4A and 4B, which shall be described later. In S302, the system control unit 115 acquires a focus evaluation value (e.g., contrast value) for the set AF frame. In S303, the system control unit 115 determines whether or not a face is detected. If a face is detected, the process advances to S305. If no face is detected, the process advances to S304.

In S304, the system control unit 115 determines whether or not the value of a "reference acquisition flag" that indicates whether or not it is necessary to acquire a reference evaluation value that is to be used in the focusing area setting process, which shall be described later, is TRUE. If the value is TRUE, the process advances to S305. If the value is FALSE, the process advances to S306.

In S305, the system control unit 115 stores the "focus evaluation value" acquired in S302 in an internal processing memory, which is not shown, as a "reference evaluation value". Then, the value of the reference acquisition flag is set to FALSE.

In S306, the system control unit 115 determines whether or not the value of a peak detection flag is TRUE. If the value is TRUE, the process advances to S323. If the value is FALSE, the process advances to S307.

In S307, the system control unit 115 acquires the current position of the focusing lens 104 through the AF processing unit 105.

In S308, the system control unit 115 acquires the focus evaluation value and adds 1 to the value of an acquisition counter to obtain the number of acquisitions of the focus evaluation value in the current position of the focusing lens 104. The acquisition counter may be the value of a specific address of the DRAM 113, and is initialized to 0 in advance in the initialization operation that is not shown here.

In S309, the system control unit 115 determines whether or not the value of the acquisition counter is 1. If the value of the acquisition counter is 1, the process advances to S312. If the value of the acquisition counter is not 1, the process advances to S310.

In S310, the system control unit 115 determines whether or not the "current focus evaluation value" is greater than the "previous focus evaluation value". If the "current focus evaluation value" is greater than the "previous focus evaluation value", the process advances to S311. Otherwise, the process advances to S318.

In S311, the system control unit 115 adds 1 to the value of an incremental counter that counts the number of times when the "current focus evaluation value" exceeds the "previous focus evaluation value". Similar to the acquisition counter, this incremental counter may be the value of a specific address of the DRAM 113, and is initialized to 0 in advance in the initialization operation that is not shown here.

In S312, the system control unit 115 stores the "current focus evaluation value" in the internal processing memory, which is not shown, as the maximum focus evaluation value (peak evaluation value).

In S313, the current position of the focusing lens 104 is stored in the processing memory, which is not shown but is contained in the system control unit 115, as a position corresponding to the peak focus evaluation value.

In S314, the system control unit 115 stores the "current focus evaluation value" in the internal processing memory as a "previous focus evaluation value".

In S315, the system control unit 115 determines whether or not the current position of the focusing lens 104 is on the edge of the focus detection range (movable range of the focusing lens 104). If the current position of the focusing lens 104 is on the edge of the focus detection range, the process advances to S316. Otherwise, the process advances to S317.

In S316, the system control unit 115 directs the AF processing unit 105 to reverse the moving direction of the focusing lens 104.

In S317, the system control unit 115 determines whether or not the values of a "face detection flag" and a "face-tracking flag", which shall be described later, are both TRUE. If both are TRUE, the process advances to S319. Otherwise, the process advances to S318.

In S318, the system control unit 115 sets the amount of movement of the focusing lens 104 per unit of time, that is, the velocity of movement, as a first value A, and then the process advances to S320.

In S319, the system control unit 115 sets the amount of movement of the focusing lens 104 per unit of time, that is, the velocity of movement, as a second value B, and then the process advances to S320.

Note that the first value (first velocity) A set in S318 and the second value (second velocity) B set in S319 are set such that, for example, A>B. This is because the process advances to S319 only when the values of the "face detection flag" and "face-tracking flag" are both TRUE, so it is easier to maintain a focusing condition in which the lens focuses on a target subject if the velocity of movement of the focusing lens 104 is set to be smaller. The second value B may be set to 0 where appropriate. In this case, the focus position can be fixed while the focusing condition in which the lens focuses on a target subject is maintained.

In S320, the system control unit 115 controls the AF processing unit 105 to move the focusing lens 104 at the velocity set in S318 or S319.

In S321, the system control unit 115 determines whether or not the value obtained by "the maximum focus evaluation value—the current focus evaluation value" is greater than a predetermined value. If the value obtained by "the maximum focus evaluation value—the current focus evaluation value" is greater than a predetermined value, the process advances to S322. Otherwise, the process advances to S314.

In S322, the system control unit 115 determines whether or not the value of the incremental counter is greater than 0. If the value is greater than 0, the process advances to S323. If the value is 0, the process advances to S314. In this step, if the focus evaluation value is kept increasing, and the value obtained by "the maximum focus evaluation value—the current focus evaluation value" exceeds a predetermined value, in other words, if the current focus evaluation value is decreased significantly from the maximum value by greater than the predetermined value, the maximum focus evaluation value at that time point is regarded as the value of the peak position.

In S323, the system control unit 115 controls the AF processing unit 105 to move the focusing lens 104 to the peak position at which the focus evaluation value reaches the maximum level.

In S324, the system control unit 115 sets the value of the peak detection flag to TRUE.

In S325, the system control unit 115 sets the value of the acquisition counter to 0.

In S326, the system control unit 115 sets the value of a "focus termination flag" that indicates that the peak position has been detected and the focus has been fixed, to TRUE, and then the process advances to S327.

In S327, the system control unit 115 determines whether or not the current focus evaluation value has changed by not less than a predetermined percentage of the maximum focus evaluation value. If the current focus evaluation value has changed by not less than a predetermined percentage, the process advances to S329. If the change is less than a predetermined percentage, the process advances to S328.

In S328, the system control unit 115 controls the AF processing unit 105 to hold the focusing lens 104 in the current position.

In S329, the system control unit 115 sets the value of the peak detection flag and the value of the focus termination flag to FALSE so as to obtain again the position of the focusing lens at which the focus evaluation value reaches the maximum level. Furthermore, the system control unit 115 resets the maximum focus evaluation value and the peak position stored in the processing memory.

In S330, the system control unit 115 resets the value of the incremental counter to 0, and then the process advances to S317.

In the manner as described above, the digital camera 100 according to the present embodiment performs focus adjustment by moving the focusing lens 104 such that a focusing condition is achieved all the time in the set AF frame during continuous AF operation. Thereby, the velocity of movement of the focusing lens when a target subject is not detected becomes slower than that when a target subject is detected, or the focusing lens stop moving. More specifically, as already described above, the amount of movement of the focusing lens per unit of time varies according to whether or not a face is detected, and the amount of movement is smaller when a face is not detected. Therefore, even if a target subject cannot be detected, it is possible to suppress a significant change in the in-focus position, and thus degradation of image quality can be prevented.

(Continuous AF Frame Setting Process)

Next, the AF frame setting operation performed in S301 of the continuous AF operation discussed above shall be described.

Figure 4B:
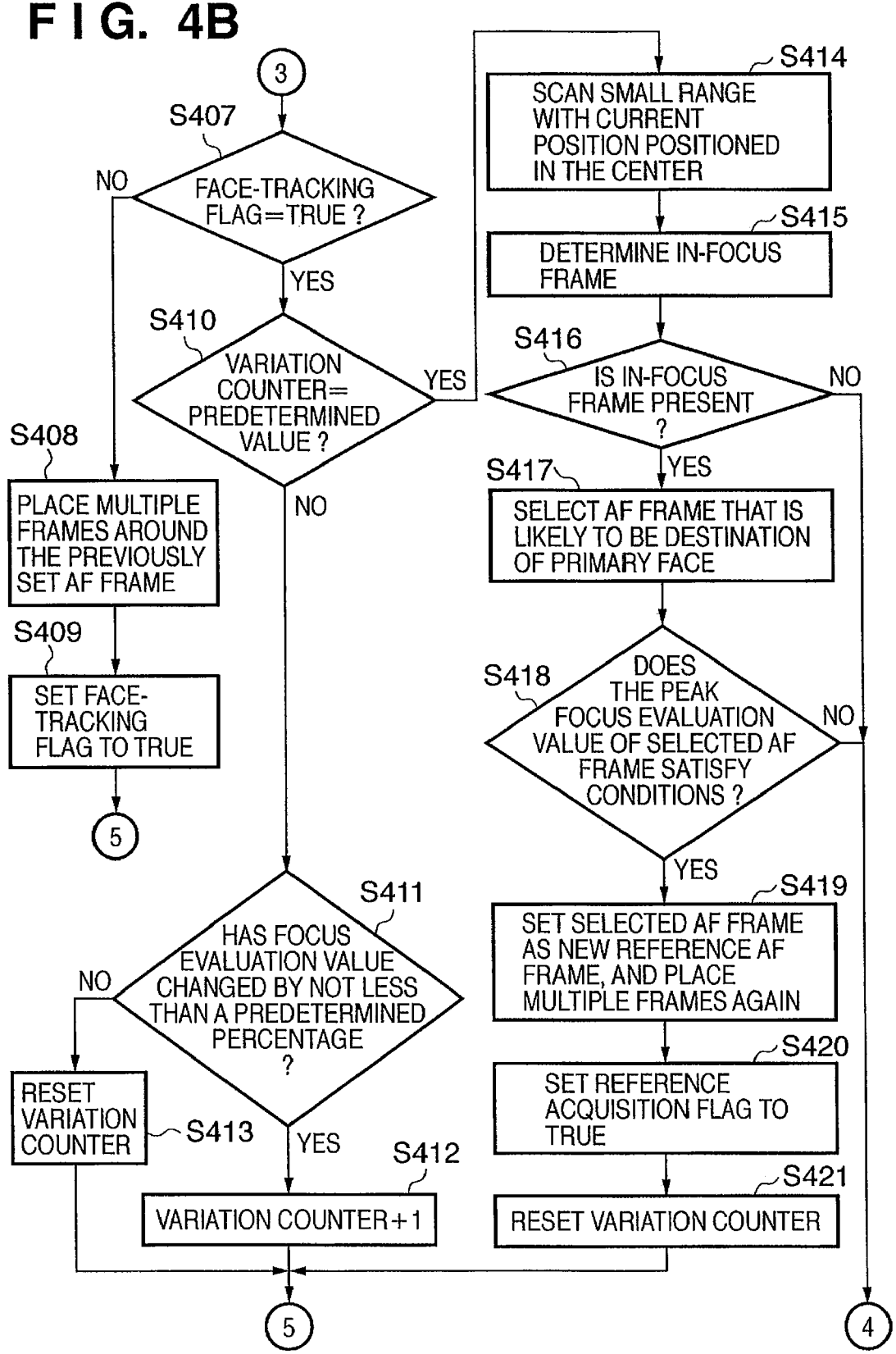

FIGS. 4A and 4B are flowcharts illustrating the details of the continuous AF frame setting process of the digital camera of the present embodiment.

In S401, the system control unit 115 determines whether or not a face is detected by the face detection unit 124. Then, if a face is detected, the process advances to S402. If a face is not detected, the process advances to S404.

Figure 5A:
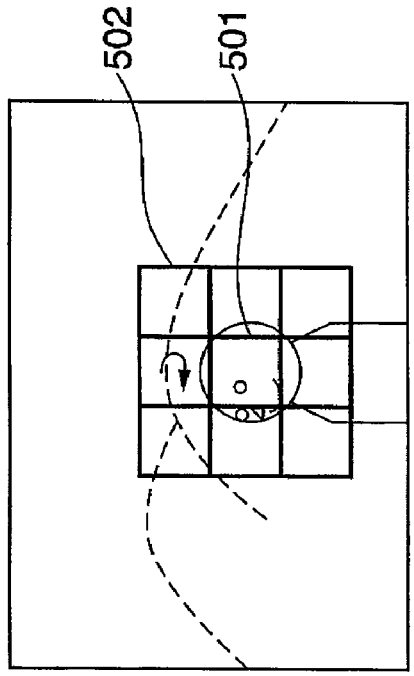
FIGS. 5A to 5D are diagrams used to illustrate specific examples of the continuous AF frame setting in a digital camera according to an embodiment of the present invention.

In S402, the system control unit 115 sets one AF frame in the position of a face having the highest priority order (hereinafter referred to as "primary face") determined based on the face information resulting from the latest face detection process. FIG. 5A is a diagram showing an example in which an AF frame 501 is set in S402 after one face has been detected and the detected face is determined as the primary face. In this case, the velocity of movement of the focusing lens 104 is set to the first velocity A described above by the system control unit 115.

It should be noted that AF frames are shown in the images of FIGS. 5A to 5D for the sake of clarity, but unlike the indication for showing a detected face as described in S207, the AF frames will not be displayed.

In the present embodiment, the AF frame 501 has a square shape having sides parallel to those of the rectangle that forms the screen. Its center may be placed in the center of the detected primary face (the position of the center of the face area), or in the center position between the eyes in the face area. Also, the sizes WID (shown in FIG. 5A) in the vertical and horizontal directions are determined based on the size of the face area of the detected primary face.

In S403, the system control unit 115 sets the value of the "face detection flag", which indicates that a face has been detected, to TRUE, and at the same time, sets the value of the "face-tracking flag", which shall be described later, to FALSE. Furthermore, the system control unit 115 resets the value of a "face NG counter" that counts the number of acquisitions of the focus evaluation value when the face can no longer be detected to 0, and then the process advances to S302 of FIG. 3A.

As just described, while the face is detected, one AF frame is constantly placed on the primary face position, and continuous AF is performed. Accordingly, it is possible to continuously maintain correct focus on the primary face.

On the other hand, if a face is not detected in S401, then in S404, the system control unit 115 determines whether or not the value of the face detection flag is TRUE. If the value of the face detection flag is TRUE, the process advances to S405. If the value of the face detection flag is FALSE, the process advances to S406.

Figure 8A:
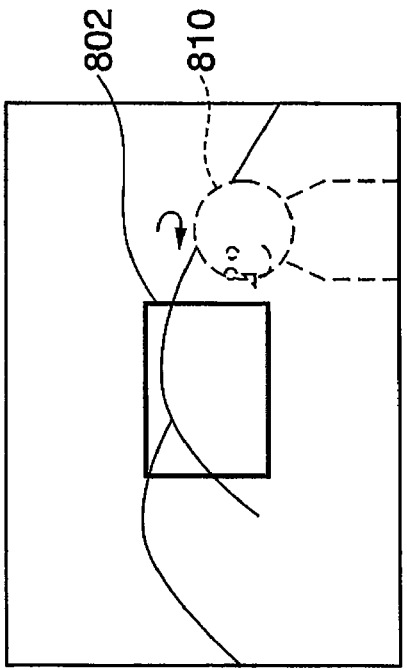
FIGS. 8A to 8D are diagrams used to illustrate the problem of a conventional method of setting AF frames utilizing detection results of a target subject.
Figure 8B:
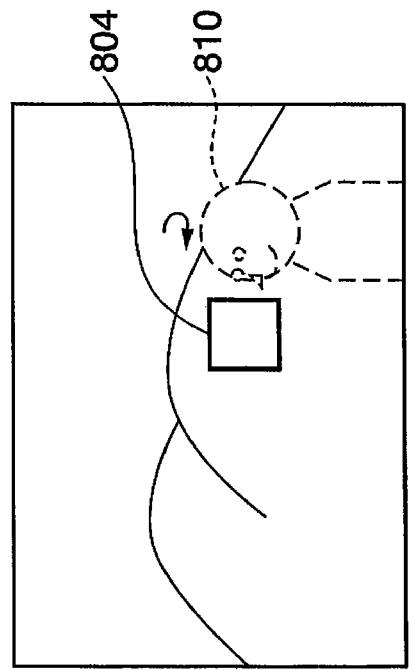
Figure 8C:
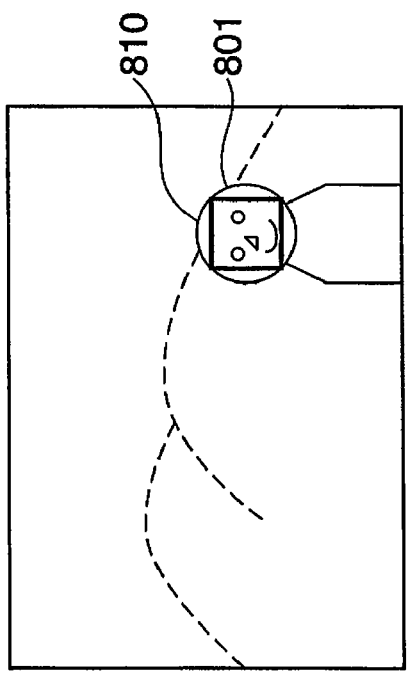
Figure 8D:
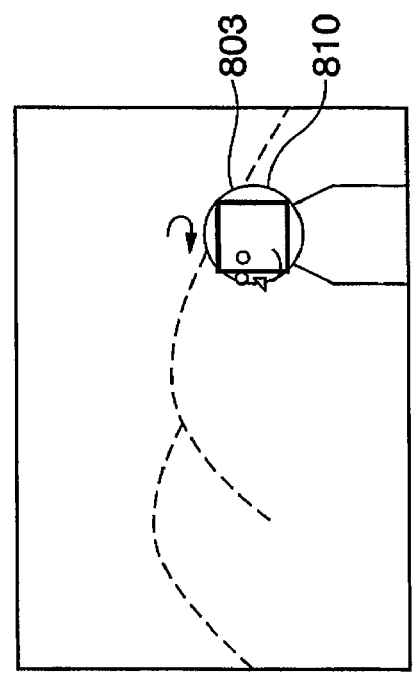

In S405, the system control unit 115 places one AF frame in, for example, the center area of the screen as shown in FIG. 8B, and sets the value of the face detection flag to FALSE. Then, the process advances to S302 of FIG. 3A. Through this, an AF frame is set in the center position of the screen that is considered highly likely to include a target subject if no face is detected and the position of a face cannot be predicted. In this case, the velocity of movement of the focusing lens 104 is set as the first velocity A described above by the system control unit 115.

In S404, if the value of the face detection flag is TRUE, then the system control unit 115 determines, in S406, whether or not the value of the focus termination flag is TRUE. If the value is TRUE, the process advances to S422. If the value is FALSE, the process advances to S407.

The process spanning from S407 to S421, which shall be described below, relates to: 1) a "face motion detection operation" through which the movement of a face is detected by comparing the focus evaluation value of the AF frame that is set based on the result of the latest face detection with the reference evaluation value that is acquired in S305 of FIG. 3A; and 2) a "face-tracking operation" performed after the detection of face movement through which an AF frame having a focus evaluation value substantially equal to the reference evaluation value is determined as a destination AF frame to which the face has been moved.

Note that while this face-tracking operation is performed, the value of the face-tracking flag is set to TRUE.

In S407, the system control unit 115 determines whether or not the value of the face-tracking flag is TRUE. If the value of the face-tracking flag is TRUE, the process advances to S410. If the value is FALSE, the process advances to S408.

In S408, the system control unit 115 sets the position of the previously set AF frame, that is, the AF frame set when the face was last detected, as a reference position, and places a plurality of AF frames (multiple frames) in the periphery of that AF frame. In this embodiment, the periphery is a rectangular area which is a part of an image, and has a plurality of focusing areas obtained by dividing this rectangular area into N×M (where N and M are both integers not less than 1, and at least one of them is not less than 2) of the same shapes. This division is performed such that the plurality of focusing areas include the focusing area having been set when the face was last detected. Accordingly, the plurality of focusing areas have a shape and size equal to those of the focusing area set when the face was last detected.

Figure 5B:
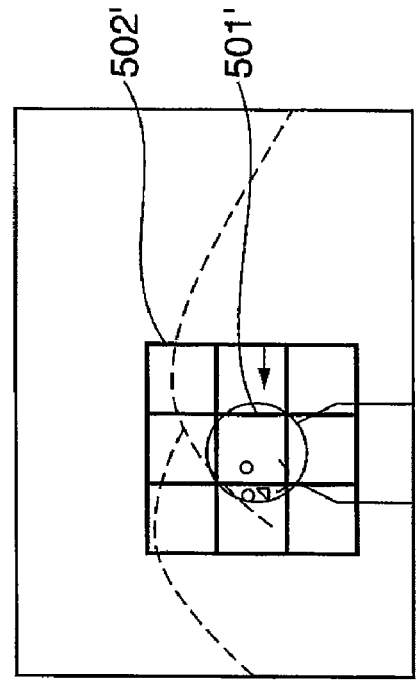

FIG. 5B shows an example in which a plurality of AF frames are set in S408 when the face of the target subject is no longer detected after the target subject has turned his/her face from the state shown in FIG. 5A. In this case, eight AF frames are set such that they surround the AF frame 501, serving as a reference AF frame, which has been set when the face was last detected. Thus, in this example, nine (N=3, M=3) AF frames in total are set in an AF frame 502.

In S409, the system control unit 115 sets the value of the face-tracking flag to TRUE. At this time, the system control unit 115 sets the velocity of movement of the focusing lens 104 to the second velocity B described above.

In S410, the system control unit 115 determines whether or not a variation counter for the focus evaluation value, which performs counting in S412 (described later), has a predetermined value. Then, if the variation counter has a predetermined value, the process advances to S414. Otherwise, the process advances to S411.

In S411, the system control unit 115 acquires a focus evaluation value for the AF frame set previously (i.e., reference AF frame), rather than for the plurality of AF frames set in S408, and then determines whether or not the resultant value has changed by not less than a predetermined percentage set as an evaluation value variation threshold relative to the reference evaluation value. If the change is not less than the predetermined percentage, the process advances to S412. Otherwise, the process advances to S413.

In S412, the system control unit 115 adds 1 to the value of the "variation counter" that counts the number of consecutive changes the focus evaluation value has changed by not less than the predetermined percentage of the reference evaluation value.

In S413, the system control unit 115 resets the variation counter to 0 because the change is less than the predetermined percentage.

Figure 5C:
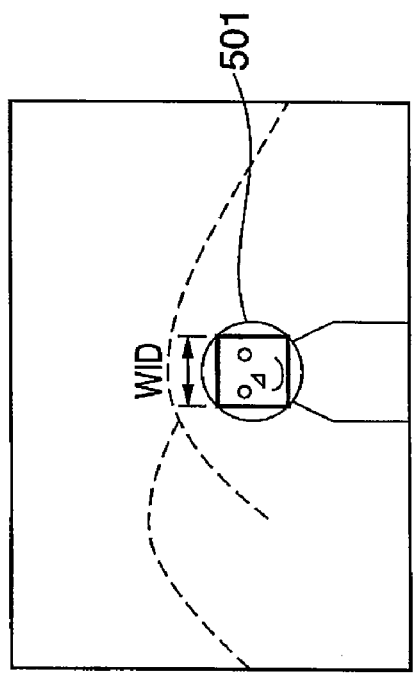

Thereby, when the target subject actually moves, for example, from the state shown in FIG. 5B to that shown in FIG. 5C, the focus evaluation value of the reference AF frame 501 changes significantly (by not less than the predetermined percentage), and thus it is possible to determine that the primary face has moved.

In this embodiment, as already described in the process of S410, when the focus evaluation value of the reference AF frame significantly changes consecutively a predetermined number of times relative to the reference evaluation value, it is determined that the primary face has moved. The predetermined number of times can be set empirically to a suitable value where appropriate because it responds to even a short-time movement if the number is set to an extremely small value, and the following capability will be low if the number is set to an extremely large value.

In S414, the system control unit 115 acquires a focus evaluation value for each of the plurality of AF frames set in S408 by controlling the AF processing unit 105 to move the focusing lens 104 in a very small range around the current position of the focusing lens 104. The focus evaluation value can be acquired by, for example, determining the contrast value of the pixel data of an area corresponding to the AF frame in the photographed image data stored sequentially in the DRAM 113.

In S415, the system control unit 115 determines whether or not each of the focus evaluation values of the AF frames acquired in the process of S414 has a peak value that is not less than a predetermined value so as to determine whether or not there is an in-focus AF frame.

In S416, the system control unit 115 determines the presence or absence of a frame determined to be an in-focus AF frame among the plurality of AF frames. If the presence of a frame determined to be an in-focus AF frame is determined, the process advances to S417. Otherwise, the process advances to S405.

In S417, the system control unit 115 determines an AF frame that is likely to be the destination of the primary face. Specifically, among those determined to be in-focus AF frames, an AF frame having a peak focus evaluation value closest to the reference evaluation value, or an AF frame having a peak value having the smallest percentage of change relative to the reference evaluation value, is determined to be an AF frame likely to be the destination of the primary face.

In S418, the system control unit 115 determines whether or not the peak focus evaluation value of the AF frame selected in S417 satisfies the requirements for determining the destination of the primary face. Specifically, it is determined whether or not the percentage of change of the peak focus evaluation value of the AF frame selected in S417 relative to the reference evaluation value is not greater than a predetermined percentage set as a face evaluation threshold. If the percentage of change is not greater than the predetermined percentage, the selected AF frame is determined to be an AF frame likely to be the destination of the primary face, and the process advances to S419. Otherwise, the process advances to S405.

In S419, the system control unit 115 sets the AF frame determined to be the destination AF frame of the primary face as a new reference AF frame, and again sets N×M AF frames.

In S420, the system control unit 115 sets the value of the reference acquisition flag to TRUE. Then, in S421, the system control unit 115 resets the value of the variation counter to 0.

Figure 5D:
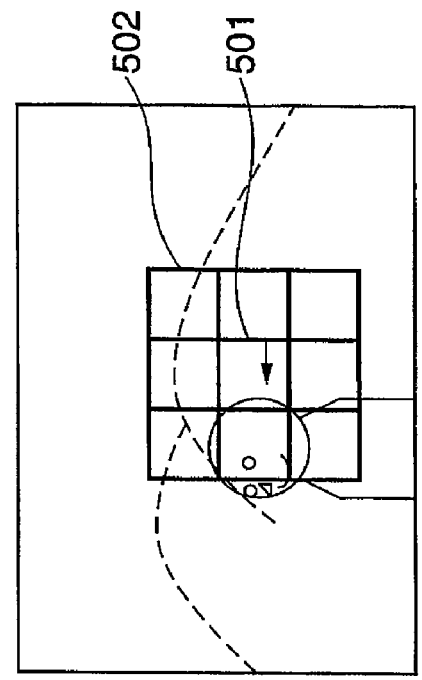

Through the above-described process, for example, even when the target subject moves as shown in FIGS. 5B to 5C, it is possible to recognize the movement of the face and determine an AF frame likely to be the destination of the face, and then set again a new reference AF frame 501' and an AF frame 502' as shown in FIG. 5D.

Accordingly, even when the target subject further moves after the face is no longer detected, it is possible to increase the possibility that the AF frames can be continuously set on the face position. Consequently, the in-focus position hardly deviates from the face. Also, because the AF frame that is set when the face is last detected is set as a reference frame, and a plurality of AF frames are set in the periphery of the reference frame, there is no need to increase the number of AF frames to a great extent, and therefore an increase in the burden of the process of determining a focus evaluation value for each AF frame will be small.

If the value of the focus termination flag A is TRUE in S406, the system control unit 115 makes, in S422, no change to the settings of the AF frame, and the process advances to S423.

In S423, the system control unit 115 adds 1 to the value of the face NG counter that counts the number of acquisitions of the focus evaluation value when the face can no longer be detected, and the process advances to S424.

In S424, the system control unit 115 determines whether or not the face NG counter has a value not less than a predetermined value. If the counter has a value not less than a predetermined value, it is determined that the target subject is no longer present in the screen, and then in S405, an AF frame is set in the center of the screen.

Thereby, when the face is not detected not less than a predetermined number of times after the detection of the face, it is determined that the face is no longer present in the screen, and the face-tracking operation can be terminated. In this process, the velocity of movement of the focusing lens 104 is set to the first velocity A described above by the system control unit 115.

The various threshold values for the continuous AF operation (S210) performed during the recording of a movie and those for the continuous AF operation (S214) performed before photographing a still image may be different. Specifically, the threshold value of the variation counter in S410 of FIG. 4B, the evaluation value variation threshold in S411, and the face evaluation threshold in S418, and the threshold value of the face NG counter in S424 may be changed.

(AF Operation)

Next, the details of the AF operation executed by the digital camera 100 of the present embodiment in S217 of FIG. 2 shall be described with reference to the flowchart shown in FIG. 6.

First, in S601, the system control unit 115 determines whether or not the continuous AF operation is being executed. If the continuous AF operation is being executed, the process advances to S602. Otherwise, the process advances to S604.

In S602, the system control unit 115 determines whether or not the value of the peak detection flag is TRUE. If the value is TRUE, the process advances to S603. Otherwise, the process advances to S604.

In S603, the system control unit 115 controls the AF processing unit 105 to move the focusing lens 104 in a range smaller than the entire focus detection range (movable range of the lens) that is set in advance with the current position positioned in the center. This is because the continuous AF operation is already performed, and thus the lens is considered to already be in a state close to the focusing condition.

In S604, the system control unit 115 controls the AF processing unit 105 to move the focusing lens 104 in the entire focus detection range.

In S605, the system control unit 115 determines whether or not each of the focus evaluation values acquired sequentially by moving the focusing lens 104 has a peak value that is not less than a predetermined value, thereby determining a focusing condition is in-focus or not.

In S606, the system control unit 115 determines whether or not it has been determined that the focusing condition is in-focus in S605. If in-focus has been determined, the process advances to S607. Otherwise, the process advances to S608.

In S607, the system control unit 115 calculates the position of the focusing lens 104 at which the focus evaluation value exhibits a peak value that is not less than a predetermined value, that is, an in-focus position, and then controls the AF processing unit 105 to move the focusing lens 104 to the in-focus position.

Then, the system control unit 115 causes the operation and display unit 117 to display an indication of the focusing area having a focusing condition, such as a frame defining the focusing area, by superimposing the frame on the EVF display image.

In S608, the system control unit 115 determines whether or not the acquisition of the focus evaluation value is performed on the entire focus detection range. If the acquisition is not performed, the process goes back to S604 so as to perform the acquisition of the focus evaluation value on the entire focus detection range. Conversely, if the acquisition of the focus evaluation value on the entire focus detection range is done, the process advances to S609.

In S609, the system control unit 115 controls the AF processing unit 105 to move the focusing lens 104 to a predetermined position called "fixed point" because the acquisition of the in-focus position is failed.

(Photographing Operation)

Next, the details of the photographing operation executed by the digital camera 100 of the present embodiment in S219 of FIG. 2 shall be described with reference to the flowchart shown in FIG. 7.

In S701, the system control unit 115 measures the brightness of a subject.

In S702, the system control unit 115 controls the AE processing unit 103 to perform exposure for the image sensor 108 with an appropriate aperture value and an appropriate shutter speed according to the brightness of the subject measured in S701. The image formed on the image sensor 108 is photoelectrically converted into analog signals, and the analog signals are transmitted to the A/D conversion unit 109 in S703, where the analog signals are converted into digital signals after a preliminary process including the removal of noise from the output of the image sensor 108, a non-linear processing, and the like are performed.

Then, in S704, the signals outputted from the A/D conversion unit 109 are converted into appropriate output image signals by the image processing unit 110.

In S705, the format conversion unit 112 converts the output image signals of the image processing unit 110 into an image format such as a JPEG format, and temporarily stores the result in the DRAM 113. In S706, the image recording unit 114 loads the image data from the DRAM 113, and records the image data in an inserted recording medium.

A configuration is employed in step S424 of FIG. 4A in which when no face detection is achieved and the setting of a plurality of focusing areas is repeated not less than a predetermined number of times, the face tracking is terminated, and a focusing area is set in the center of the screen. However, the present invention is not limited thereto, and it is also possible to adopt a configuration in which when no face detection is achieved for a predetermined length of time, the face tracking is terminated, and a focusing area is set in the center of the screen.

Also, in the description given above, a configuration is employed in which focus adjustment is performed by detecting the face of a subject based on a captured image, determining a target subject based on the detected face area, setting a focusing area corresponding to the target subject, and computing the focus evaluation value based on the captured image of the focusing area. However, the present invention is not limited thereto.

It is also possible to adopt a configuration in which focus adjustment is performed by, for example, detecting the defocus amount of the focusing lens 104 in the focusing area of a phase difference detection sensor that corresponds to the detected face area. In this case also, when the face of the target subject can no longer be detected, the defocus amount of the focusing lens 104 is detected for the position of the target subject obtained when the face is previously detected and for the focusing area of the phase difference detection sensor that corresponds to the periphery of the target subject position. Furthermore, the velocity of movement of the focusing lens 104 when the face can no longer be detected is made slower than that when the face is detected, or in other words, the amount of movement per unit of time is set to be smaller. Thereby, even when the face is no longer detected, it is possible to prevent the detected in-focus position from deviating significantly from the position of the lens that is adjusted to the actual distance to the face.

Also, in the description given above, a configuration is employed in which the velocity of movement of the focusing lens 104, that is, the amount of movement per unit of time, when the face detection is achieved and an AF frame is set in the position of the primary face is set to the first value A described previously by the system control unit 115. Also, a configuration is employed in which the velocity of movement of the focusing lens 104, that is, the amount of movement per unit of time, when no face detection is achieved and the face-tracking flag is TRUE is set to the second value B described previously by the system control unit 115. Also, a configuration is employed in which the amount of movement of the focusing lens 104 per unit of time when an AF frame is set in a predetermined position (e.g., in the center of the screen) is set to the first value A as described previously by the system control unit 115.

However, the present invention is not limited thereto. For example, the amount of movement of the focusing lens 104 per unit of time when the face detection is achieved and that when an AF frame is set in a predetermined position may be different. In this case, the amount of movement of the focusing lens 104 per unit of time when no face detection is achieved and the face-tracking flag is TRUE is set to be smaller than that when the face detection is achieved or when an AF frame is set in a predetermined position. In other words, the velocity of movement of the focusing lens 104 of the latter is made slower than that of the former. Thereby, it is possible to prevent the detected in-focus position from deviating significantly from the position of the lens that is adjusted to the distance to the target subject.

Also, a configuration is employed in which an AF frame is set in the center when the face detection flag is not TRUE, when no in-focus frame is found, when the focus evaluation value of the selected AF frame does not satisfy the conditions, or when the face tracking is performed for a long period of time. In this configuration, it is possible to set only one AF frame, or a plurality of AF frames.

As described above, according to the present embodiment, in a focusing device that sets a focusing area according to a detection result of a target subject, when the state is changed from a state in which the target subject is detected to a state in which the target subject is no longer detected, an area that is likely to be the destination of the target subject is found, and a focusing area is set. Specifically, when the target subject is no longer detected after the detection of the target subject and the setting of a focusing area, the velocity of the movement of the focusing lens is made slower than that when the detection is achieved. Furthermore, when a comparison is made between the case where the detection is no longer achieved, and the case where a focusing area is set in the center of the screen after it is determined that the target subject is no longer present in the screen, the velocity of movement of the focusing lens when it is determined that the target subject is no longer present in the screen is made faster. Accordingly, even when the target subject is no longer detected, it is possible to prevent the detected in-focus position from deviating significantly from the position of the lens that is adjusted to the distance to the face. Furthermore, when the detection of the target subject is achieved, or when it is determined that the target subject is no longer present in the screen, it is possible to focus on the user's selected subject with good following capability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-031281, filed Feb. 9, 2007, which is hereby incorporated by reference herein in its entirety.

What is claimed is:

1. A focusing device comprising:
a detection unit adapted to detect a focusing target from a captured image;
a setting unit adapted to set, in response to the detection of the focusing target by the detection unit, a focusing area for detecting a focusing condition of a focusing lens; and
a focus adjustment unit adapted to perform focus adjustment by moving the focusing lens based on an image of the focusing area,
wherein the focus adjustment unit is operable, when the focusing area has been set by the setting unit in response to the detection of the focusing target by the detection unit, to cause the focusing lens to move at a first velocity, and further operable, when the focusing target is no longer detected after the focusing area has been set, to cause the focusing lens to move at a second velocity that is slower than the first velocity.

2. A focusing device according to claim 1, wherein the focus adjustment unit is further operable, when the focusing target has not been detected by the detection unit and it has been determined that the focusing target is not present in the image, to cause the focusing lens to move at a third velocity that is faster than the second velocity.

3. A focusing device according to claim 2, wherein the focus adjusting unit is operable to cause the focusing lens to move at the third velocity when the focusing target is not detected for a predetermined length of time after the focusing area has been set.

4. The focusing device according to claim 2, wherein the focus adjusting unit is operable to cause the focusing lens to move at the third velocity when the focusing target is not detected by the detection unit not less than a predetermined number of times after the focusing target is no longer detected after the focusing area has been set.

5. A focusing device according to claim 1, wherein the focus adjustment unit is further operable, when the focusing area is set in a predetermined position by the setting unit after the focusing target can no longer be detected by the detection unit, to cause focusing lens to move at a fourth velocity that is faster than the second velocity.

6. A focusing device according to claim 1, wherein the setting unit is operable to set a first focusing area when the focusing target is detected by the detection unit, and the setting unit is operable subsequently, when the focusing target can no longer be detected by the detection unit, to set a second focusing area, in addition to the first focusing area, based on the position of the first focusing area.

7. A focusing device according to claim 1, wherein the setting unit is operable to set a first focusing area in the screen when the focusing target is detected by the detection unit, and subsequently, when the focusing target can no longer be detected by the detection unit, the setting unit is operable to set a second focusing area, in addition to the first focusing area, based on the position of the focusing target having been detected by the detection unit, and wherein the focus adjustment unit is operable to drive the focusing lens based on images of the set first and second focusing areas.

8. A focusing device according to claim 1, wherein the detection unit is operable to detect at least one of the position, size and reliability of a subject serving as the focusing target.

9. A focusing device comprising:
    detection means for detecting a focusing target from a captured image;
    setting means for setting, in response to the detection of the focusing target by the detection means, a focusing area for detecting a focusing condition of a focusing lens; and
    focus adjustment means for performing focus adjustment by moving the focusing lens based on an image of the focusing area,
    wherein the focus adjustment means is operable, when the focusing area has been set by the setting means in response to the detection of the focusing target by the detection means, to cause the focusing lens to move at a first velocity, and further operable, when the focusing target is no longer detected after the focusing area has been set, to cause the focusing lens to move at a second velocity that is slower than the first velocity.

10. An image-capturing apparatus comprising:
    an image-capture unit adapted to photoelectrically convert an image of a subject and output an image;
    a recording unit adapted to perform control to record the image obtained by the image-capture unit in a recording medium; and
    a focusing device comprising:
    a detection unit adapted to detect a focusing target from a captured image;
    a setting unit adapted to set, in response to the detection of the focusing target by the detection unit, a focusing area for detecting a focusing condition of a focusing lens; and
    a focus adjustment unit adapted to perform focus adjustment by moving the focusing lens based on an image of the focusing area,
    wherein the focus adjustment unit is operable, when the focusing area has been set by the setting unit in response to the detection of the focusing target by the detection unit, to cause the focusing lens to move at a first velocity, and further operable, when the focusing target is no longer detected after the focusing area has been set, to cause the focusing lens to move at a second velocity that is slower than the first velocity.

11. An image-capturing apparatus comprising:
    an image-capture means for photoelectrically converting an image of a subject and outputting an image;
    a recording means for performing control to record the image obtained by the image-capture means in a recording medium; and
    a focusing device comprising:
    detection means for detecting a focusing target from a captured image;
    setting means for setting, in response to the detection of the focusing target by the detection means, a focusing area for detecting a focusing condition of a focusing lens; and
    focus adjustment means for performing focus adjustment by moving the focusing lens based on an image of the focusing area,
    wherein the focus adjustment means is operable, when the focusing area has been set by the setting means in response to the detection of the focusing target by the detection means, to cause the focusing lens to move at a first velocity, and further operable, when the focusing target is no longer detected after the focusing area has been set, to cause the focusing lens to move at a second velocity that is slower than the first velocity.

12. A focusing method comprising:
    detecting a focusing target from a captured image;
    setting, in response to the detection of the focusing target, a focusing area for detecting a focusing condition of a focusing lens; and
    adjusting a focus by moving the focusing lens based on an image of the focusing area,
    wherein the adjusting comprises, when the focusing area has been set, causing the focusing lens to move at a first velocity, and further comprises, when the focusing target is no longer detected, causing the focusing lens to move at a second velocity that is slower than the first velocity.

* * * * *